(12) United States Patent
Ryu et al.

(10) Patent No.: US 12,145,261 B2
(45) Date of Patent: Nov. 19, 2024

(54) STRING ACTUATOR-BASED EXOSKELETON ROBOT

(71) Applicant: KOREA ADVANCED INSTITUTE OF SCIENCE AND TECHNOLOGY, Daejeon (KR)

(72) Inventors: Jee Hwan Ryu, Daejeon (KR); Hyeonseok Seong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 652 days.

(21) Appl. No.: 17/426,920

(22) PCT Filed: May 26, 2021

(86) PCT No.: PCT/KR2021/095061
§ 371 (c)(1),
(2) Date: Jul. 29, 2021

(87) PCT Pub. No.: WO2021/242083
PCT Pub. Date: Dec. 2, 2021

(65) Prior Publication Data
US 2022/0314429 A1 Oct. 6, 2022

(30) Foreign Application Priority Data
May 28, 2020 (KR) ........................ 10-2020-0064094

(51) Int. Cl.
*B25J 9/00* (2006.01)
*B25J 9/10* (2006.01)
*B25J 13/08* (2006.01)

(52) U.S. Cl.
CPC ............. *B25J 9/0006* (2013.01); *B25J 9/104* (2013.01); *B25J 13/085* (2013.01); *B25J 13/088* (2013.01)

(58) Field of Classification Search
CPC ........ B25J 9/0006; B25J 9/104; B25J 13/085; B25J 13/088; B25J 9/0009; B25J 9/126; B25J 19/005; B25J 19/02
See application file for complete search history.

(56) References Cited

U.S. PATENT DOCUMENTS 9,566,173 B2 * 2/2017 Ryu ......................... B25J 13/02
10,710,237 B2 * 7/2020 Kumeno .................. A61H 3/00
(Continued)

FOREIGN PATENT DOCUMENTS

JP         5505740 B2    5/2014
JP      2018-155294 A   10/2018
(Continued)

OTHER PUBLICATIONS

Notice of Allowance issued on Apr. 20, 2022 for KR Patent Application No. 10-2020-0064094.
(Continued)

*Primary Examiner* — Masud Ahmed
(74) *Attorney, Agent, or Firm* — Knobbe, Martens, Olson & Bear, LLP

(57) ABSTRACT

A string actuator-based exoskeleton robot includes: a driving force conversion unit including a fixed frame and a rotation pulley and mountable on a side portion of the waist of a human body; a driving unit including a driving motor providing a driving force and a pair of strings provided in double rows to have one side connected to the driving motor and the other side connected to the rotation pulley, and assisting the rotation of the rotation pulley by twisting or untwisting the pair of strings with or from each other by a rotational driving force of the driving motor to vary a length of the pair of strings; and a support unit formed to extend from the rotation pulley to at least one of a front surface or
(Continued)

a rear surface of the femoral region of the human body to support the femoral region of the human body.

11 Claims, 16 Drawing Sheets

(56) References Cited

U.S. PATENT DOCUMENTS

| | | | |
|---|---|---|---|
| 10,926,123 B2* | 2/2021 | Lear | A61H 1/02 |
| 2008/0066574 A1* | 3/2008 | Murata | B25J 9/104 |
| | | | 74/826 |
| 2009/0299243 A1* | 12/2009 | Hirata | A61F 5/0193 |
| | | | 602/23 |
| 2018/0021618 A1* | 1/2018 | Lee | A63B 21/00181 |
| | | | 482/78 |

FOREIGN PATENT DOCUMENTS

| | | |
|---|---|---|
| KR | 10-1419697 B1 | 7/2014 |
| KR | 10-2019-0031584 A | 3/2019 |
| KR | 10-2019-0129726 A | 11/2019 |
| WO | 2019/156361 A1 | 8/2019 |

OTHER PUBLICATIONS

Office Action of Korean Patent Application No. 10-2020-0064094—5 pages (Jul. 6, 2021).

* cited by examiner

STRING ACTUATOR-BASED EXOSKELETON ROBOT

TECHNICAL FIELD

The present invention relates to an exoskeleton robot formed to be wearable on a human body, and more particularly, to a string actuator-based exoskeleton robot capable of accessorily providing an efficient output so that a load acting on the user's waist and spine may be reduced when a user lifts a heavy object.

BACKGROUND ART

In a process where a worker performs various operations and lifts a heavy object at a work site or the like, a main cause of a back pain occurring in the worker is a high pressure applied to a disk of the spine.

In addition, recently, in accordance with advancement of research into robotics, research into a wearable robot directly worn on a human body to assist an operation of the human body has also been actively conducted.

In particular, such a wearable robot may be divided into a wearable robot for muscle strength enhancement assisting a user to have more excellent athletic ability, a physical assistive wearable robot providing an assistive function of a body to a user with a physical disability, and the like, according to a use purpose.

However, the wearable robots implemented so far are generally in a research stage, such that a process of wearing the wearable robots is complicated and the wearable robots are heavy, which lays a great burden on the user. In addition, driving systems of such wearable robots may not sufficiently provide a required output or provide an excessive output in a process of assisting an operation of the human body, such that they have a driving form that is not appropriate for actual movement of the human body in many cases. Therefore, it is difficult to actually apply such wearable robots to reality.

Therefore, a method for solving these problems is required.

DISCLOSURE

Technical Problem

The present invention has been made in an effort to solve the problems of the related art described above, and an object of the present invention is to provide an exoskeleton robot capable of generating a high output as compared with its own weight, being weight-lightened and miniaturized to be easily worn on a human body, and effectively reducing a load applied to the waist and the spine through an efficient driving mechanism.

Objects of the present disclosure are not limited to the above-mentioned objects, and other objects that are not mentioned may be obviously understood by those skilled in the art from the following specification.

Technical Solution

In one general aspect, a string actuator-based exoskeleton robot includes: a driving force conversion unit including a fixed frame and a rotation pulley provided to be rotatable relatively with respect to the fixed frame and formed to be mountable on a side portion of the waist of a human body; a driving unit including a driving motor providing a driving force and a plurality of strings provided in double rows so as to have one side connected to the driving motor and the other side connected to the rotation pulley and assisting the rotation of the rotation pulley by twisting or untwisting the plurality of strings with or from each other by a rotational driving force of the driving motor to vary a length of the plurality of strings; and a support unit formed to extend from the rotation pulley to at least one of a front surface or a rear surface of the femoral region of the human body to support the femoral region of the human body.

A pair of driving force conversion units may be provided on both side portions of the waist of the human body, and a pair of driving units and a pair of support units are provided to correspond to the pair of driving force conversion units.

The string actuator-based exoskeleton robot may further include a control unit including a battery portion supplying power to the driving unit.

The driving force conversion unit may further include an encoder including: a fixed detection portion provided in the fixed frame; and a rotation detection portion provided in the rotation pulley so as to be rotatable relatively with respect to the fixed detection portion by sharing a rotary shaft of the rotation pulley with the fixed frame and detecting a rotational displacement of the rotation pulley in conjunction with the fixed detection portion.

The string actuator-based exoskeleton robot may further include a mount unit which is provided to surround the waist of the human body and to which the fixed frame is fixed.

The mount unit may include: a belt portion which is mounted to surround a circumference of the waist of the human body; and a fastening portion which is provided on an outer side of the belt portion along at least a part of a circumference of the belt portion and to which the fixed frame is fastened.

The driving force conversion unit may further include a first connection portion connecting the fixed frame to the fastening portion.

The driving unit may include: an extension guide providing a path through which the plurality of strings extend; and a support frame having an inner portion in which an accommodating space is formed, an upper portion on which the driving motor is seated, and a lower portion to which the extension guide is connected.

The driving force conversion unit may further include a second connection portion connecting the fixed frame to a lower end portion of the extension guide.

The driving unit may further include a coupler including a motor coupling which is connected to a rotary shaft of the driving motor to be rotated by the rotational driving force of the driving motor and a string coupling to which one side of the pair of strings is connected and which is directly connected to the motor coupling to be rotated together with the motor coupling.

The driving unit may further include a load cell provided between the support frame and the extension guide and detecting an external force applied to the plurality of strings.

The support unit may include: an extension portion having one side connected to the rotation pulley and the other side extending downward along an outer side portion of the femoral region of the human body; and a support portion extending from a lower end portion of the extension portion to an inner side of the femoral region of the human body so as to support the front surface or the rear surface of the femoral region of the human body.

Advantageous Effects

The string actuator-based exoskeleton robot according to the present invention for solving the above object may assist an operation of the user through the string actuator-based driving unit to generate a high output as compared with its own weight and provide a stable and efficient output, thereby making it possible to minimize a load applied to the user's waist and spine.

In addition, the string actuator-based exoskeleton robot according to the present invention may be weight-lightened and miniaturized due to a simple entire structure and an ergonomic design, and may thus be easily worn on the human body.

The effects of the present invention are not limited to the above-mentioned effects, and other effects that are not mentioned may be obviously understood by those skilled in the art from the claims.

BEST MODE

Figure 1:
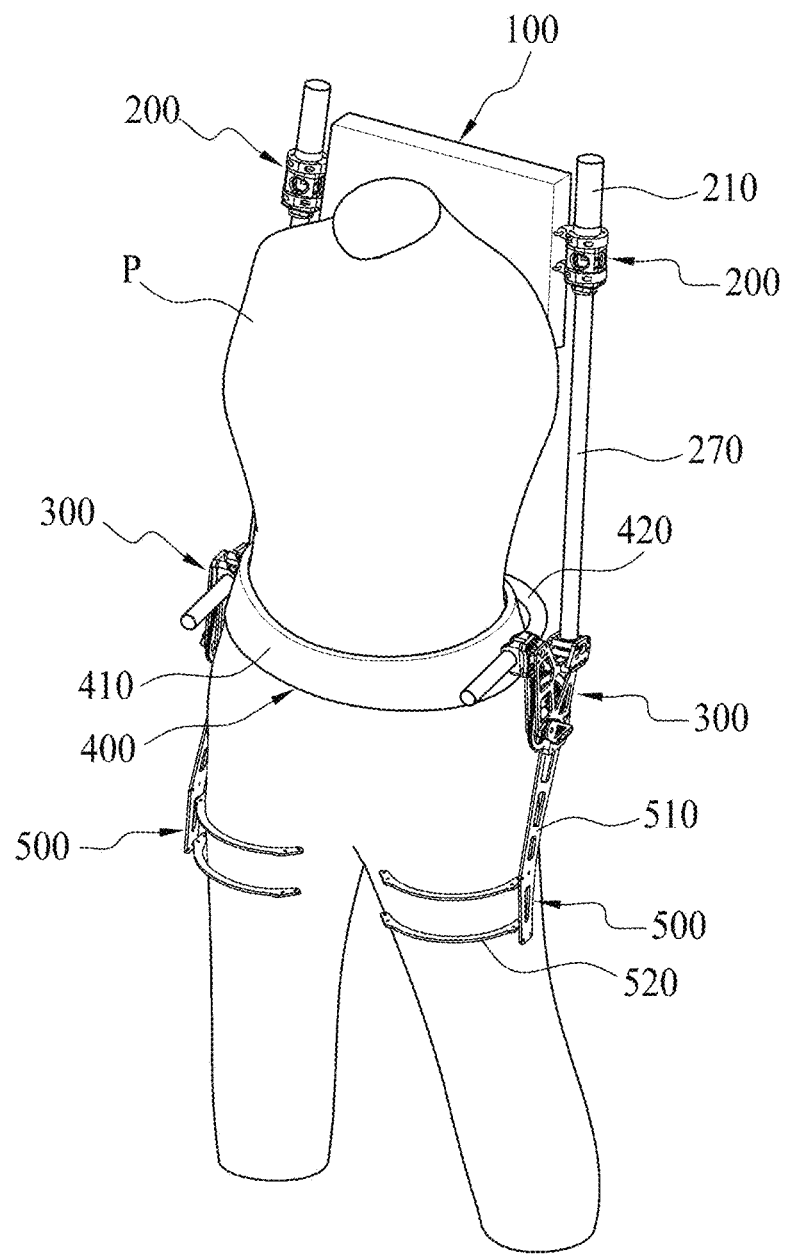
FIGS. 1 and 2 are views illustrating a form in which a user wears an exoskeleton robot according to an embodiment of the present invention.

Hereinafter, a preferred embodiment of the present invention in which objects of the present invention may be specifically implemented will be described with reference to the accompanying drawings. In describing the present embodiment, the same components will be denoted by the same names and the same reference numerals, and an additional description therefor will be omitted.

Figure 2:
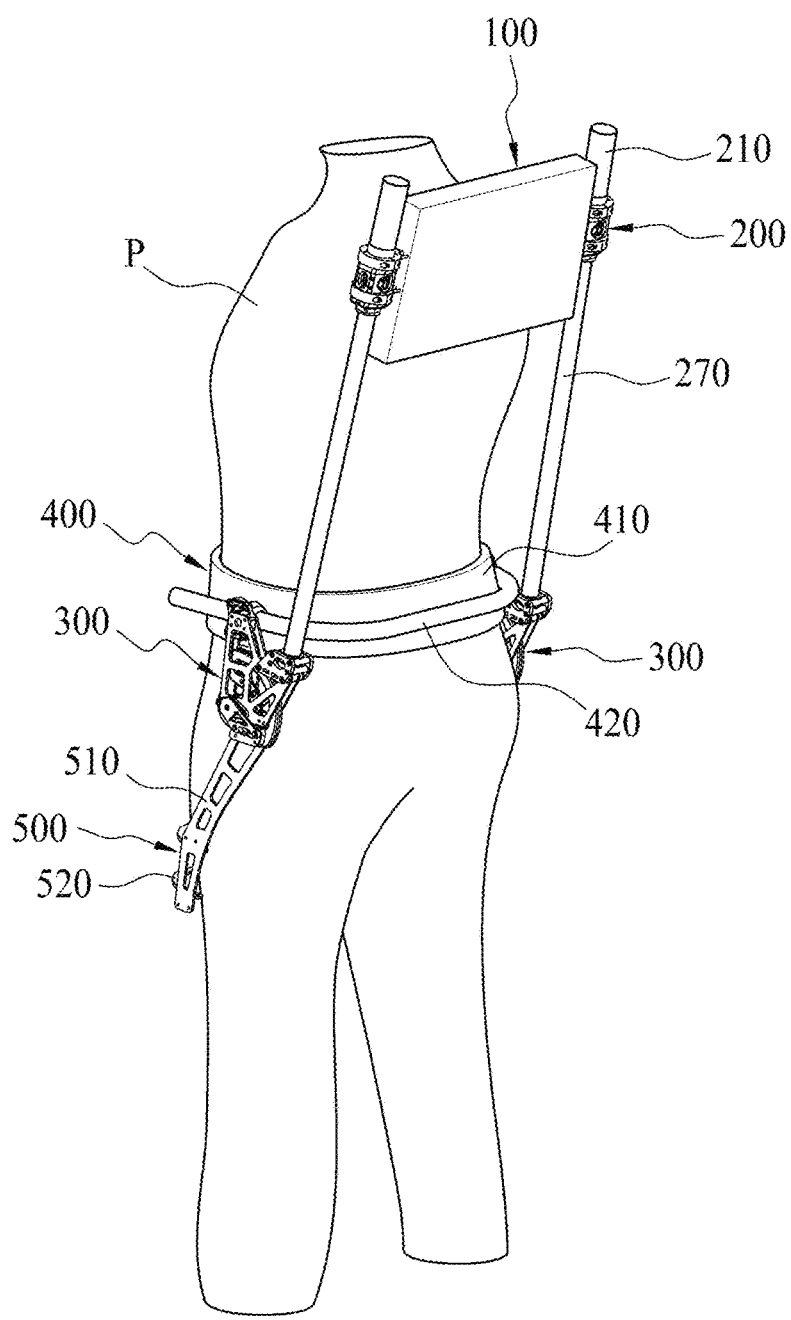

FIGS. 1 and 2 are views illustrating a form in which a user wears an exoskeleton robot according to an embodiment of the present invention.

Figure 3:
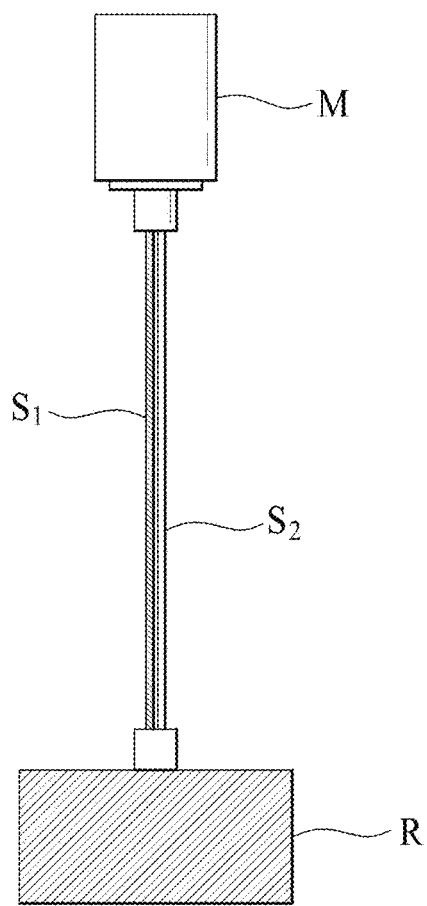
FIGS. 3 and 4 are views illustrating a driving principle of a string actuator applied to the exoskeleton robot according to an embodiment.
Figure 4:
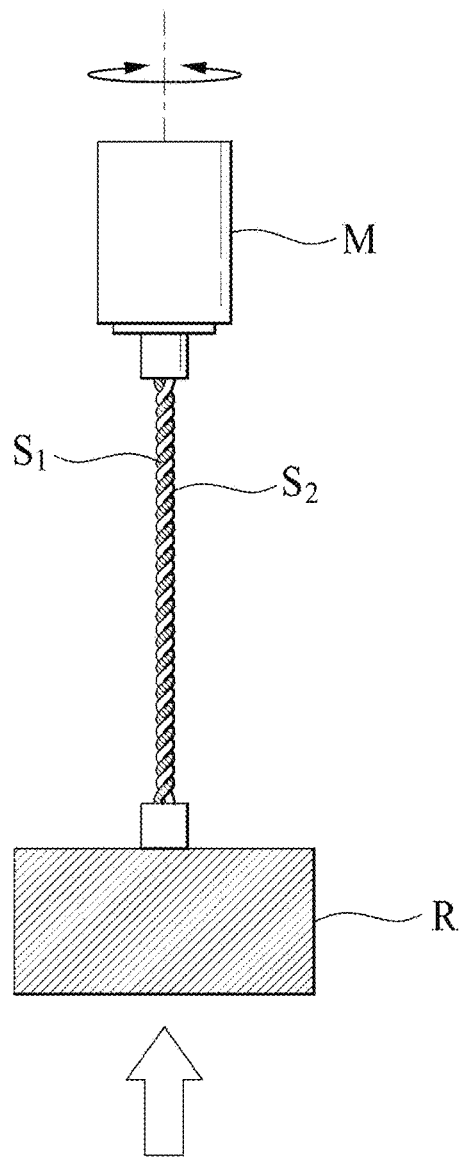
Figure 5:
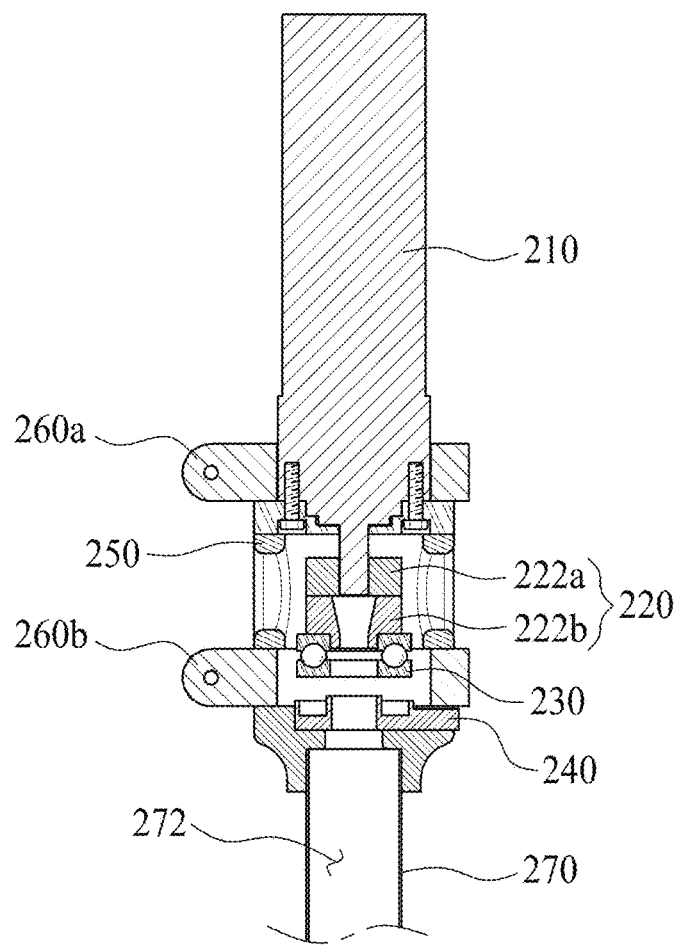
FIG. 5 is a view illustrating a detailed structure of a driving unit in the exoskeleton robot according to an embodiment of the present invention.
Figure 6:
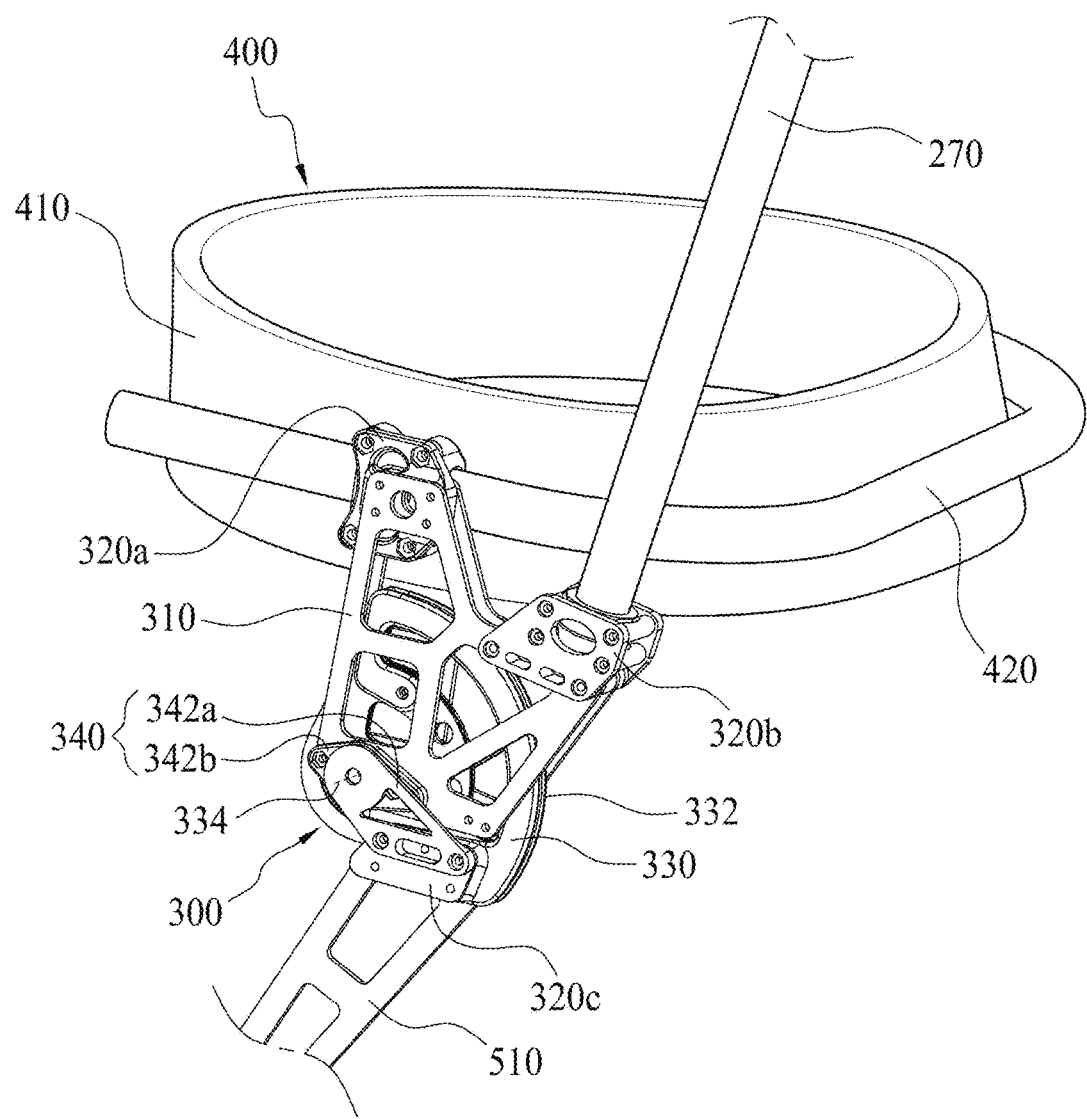
FIG. 6 is a view illustrating a detailed structure of a driving force conversion unit in the exoskeleton robot according to an embodiment of the present invention.

In addition, FIGS. 3 and 4 are views illustrating a driving principle of a string actuator applied to the exoskeleton robot according to an embodiment, FIG. 5 is a view illustrating a detailed structure of a driving unit 200 in the exoskeleton robot according to an embodiment of the present invention, and FIG. 6 is a view illustrating a detailed structure of a driving force conversion unit 300 in the exoskeleton robot according to an embodiment of the present invention.

As illustrated in FIGS. 1 to 6, the exoskeleton robot according to an embodiment of the present invention includes a driving force conversion unit 300, a driving unit 200, a support unit 500, a control unit 100, and a mount unit 400.

The driving force conversion unit 300 is a component converting a driving force generated by the driving unit 200 into a rotational driving force, and includes, in detail, a fixed frame 310 and a rotation pulley 330 provided to be rotatable relatively with respect to the fixed frame 310.

In addition, the driving force conversion unit 300 is formed to be mountable on a side portion of the waist of a human body P, and in the present embodiment, a pair of driving force conversion units 300 are provided on both side portions of the waist of the human body.

The driving unit 200 is provided on the back of the human body P so as to be elongated in a vertical direction, and includes a driving motor 210 providing a driving force and a plurality of strings S1 and S2 provided in double rows so as to have one side connected to the driving motor 210 and the other side connected to the rotation pulley 330.

It has been described in the present embodiment that a pair of strings S1 and S2 are provided, but the number of strings S1 and S2 provided in one driving unit 200 may be more than one pair.

Therefore, the driving unit 200 may assist the rotation of the rotation pulley 330 by twisting or untwisting the pair of strings S1 and S2 with or from each other by a rotational driving force of the driving motor 210 to vary a length of the pair of strings S1 and S2.

In addition, to this end, a recessed groove 332 recessed so that the pair of strings S1 and S2 are inserted may be formed in a part of a circumference of the rotation pulley 330.

A concept of the string actuator applied to the driving unit 200 according to the present invention will be described in more detail with reference to FIGS. 3 and 4. The string actuator may be implemented by a driving motor M and a pair of strings S1 and S2 formed in double rows.

First, as illustrated in FIG. 3, in the present example, one side of the pair of strings S1 and S2 is connected to the driving motor M, and the other side of the pair of strings S1 and S2 is connected to a heavy object R.

In a case where the driving motor M is rotationally driven as illustrated in FIG. 4 in such a state, one side of the pair of strings S1 and S2 rotates together with the driving motor M, and accordingly, the pair of strings S1 and S2 are twisted. Therefore, an entire length of the pair of strings S1 and S2 is inevitably reduced, and the heavy object R connected to the other side of the pair of strings S1 and S2 is lifted.

The string actuator according to the present invention having such a manner has an advantage that it is more excellent in terms of an output compared to a volume than other actuators according to the related art and may be applied to various mechanical devices.

In addition, it has been illustrated in an example of FIGS. 3 and 4 to lift the heavy object R using the string actuator, but in the string actuator applied to the driving unit 200 in the present invention, the other side of the pair of strings S1 and S2 is fixed to a string fixing region 336 (see FIG. 7) of the rotation pulley 330, such that the pair of strings S1 and S2 are twisted or untwisted with or from each other by the rotational driving force of the driving motor 210 and the length of the pair of strings S1 and S2 is thus varied, thereby making it possible to assist the rotation of the rotation pulley 330.

In addition, more detailed structures of the driving unit 200 and the driving force conversion unit 300 will be described later.

The support unit 500 is a component extending from the rotation pulley 330 to at least one of a front surface or a rear surface of the femoral region of the human body P to support the femoral region of the human body P. In the present embodiment, the support unit 500 may include an extension portion 510 having one side connected to the rotation pulley 330 and the other side extending downward along an outer side portion of the femoral region of the human body P and a support portion 520 extending from a lower end portion of the extension portion 510 to an inner side of the femoral region of the human body P so as to support the front surface or the rear surface of the femoral region of the human body P. In this case, the support portion 520 may extend to one side so as to support any one of the front surface or the rear surface of the femoral regions or extend to both sides so as to support both the front surface and the rear surface of the femoral regions.

In particular, only a frame having rigidity in the support portion 520 so as to support the femoral region of the human body P has been illustrated in the drawings, but the support portion 520 may further include a cover formed to surround the support portion 520 and made of a material having flexibility and capable of absorbing a shock.

Such a support unit 500 comes into contact with the front surface or the rear surface of the femoral region in a process in which a user wearing the exoskeleton robot according to the present invention bends his/her back to generate a supporting force, thereby allowing the rotation pulley 330 of the driving force conversion unit 300 to be able to rotate with respect to the fixed frame 310.

In addition, as described above, in the present embodiment, a pair of driving force conversion units 300 are provided on both side portions of the human body, and thus, a pair of driving units 200 and a pair of support units 500 may also be provided to correspond to the pair of driving force conversion units 300.

The control unit 100 may be provided between the pair of driving units 200, and may include a microcontroller unit (MCU) for controlling each portion as well as a battery portion supplying power to the driving units 200.

Meanwhile, the mount unit 400 is a component which is provided to surround the waist of the human body P and to which the fixed frame 310 is fixed.

In the present embodiment, the mount unit 400 includes a belt portion 410 which is mounted to surround a circumference of the waist of the human body P and a fastening portion 420 which is provided on an outer side of the belt portion 410 along at least a part of a circumference of the belt portion 410 and to which the fixed frame 310 is fastened.

It has been described particularly in the present embodiment that the fastening portion 420 is formed in a U shape so as to surround both sides and a rear of the belt portion 410 and has a cross section formed in a circular shape, but the fastening portion 420 may also be formed in various shapes unlike the present embodiment.

Hereinafter, more detailed structures of the driving unit 200 and the driving force conversion unit 300 will be described with reference to FIGS. 5 and 6.

As illustrated in FIG. 5, in the present embodiment, the driving unit 200 includes an extension guide 270 formed to be elongate in the vertical direction and having an inner portion in which a hollow portion 272 providing a path through which the pair of strings S1 and S2 extend is formed, and a support frame 250 having an inner portion in which an accommodating space is formed, an upper portion on which the driving motor 210 is seated, and a lower portion to which the extension guide 270 is connected.

In this case, the support frame 250 may include a motor mount 260a fixing the driving motor 210 and a load cell mount 260b fixing a load cell 240 to be described later.

In addition, the driving unit 200 may further include a coupler 220 including a motor coupling 222a which is connected to a rotary shaft of the driving motor 210 to be rotated by the rotational driving force of the driving motor 210 and a string coupling 222b to which one side of the pair of strings S1 and S2 is connected and which is directly connected to the motor coupling 222a to be rotated together with the motor coupling 222a.

In addition, the driving unit 200 may further include a thrust bearing 230 allowing the string coupling 222b to be smoothly rotated and a load cell 240 provided between the support frame 250 and the extension guide 270 and detecting an external force applied to the pair of strings S1 and S2.

Next, as illustrated in FIG. 6, the driving force conversion unit 300 may further include an encoder 340 including a fixed detection portion 342b provided in the fixed frame 310 and a rotation detection portion 342a provided in the rotation pulley 330 so as to be rotatable relatively with respect to the fixed detection portion 342b by sharing a rotary shaft 334 of the rotation pulley 330 with the fixed frame 310 and detecting a rotational displacement of the rotation pulley 330 in conjunction with the fixed detection portion 342b.

In addition, the rotational displacement of the rotation pulley 330 detected by the encoder 340 may be transmitted to the MCU of the control unit 100 described above.

In addition, the driving force conversion unit 300 may include a first connection portion 320a connecting the fixed frame 310 to the fastening portion 420 of the mount unit 400, a second connection portion 320b connecting the fixed frame 310 to a lower end portion of the extension guide 270 of the driving unit 200, and a third connection portion 320c connecting the fixed frame 310 to an upper end portion of the extension portion 510 of the support unit 500.

A driving process of the exoskeleton robot according to the present embodiment having the structure as described above is as follows.

Figure 7:
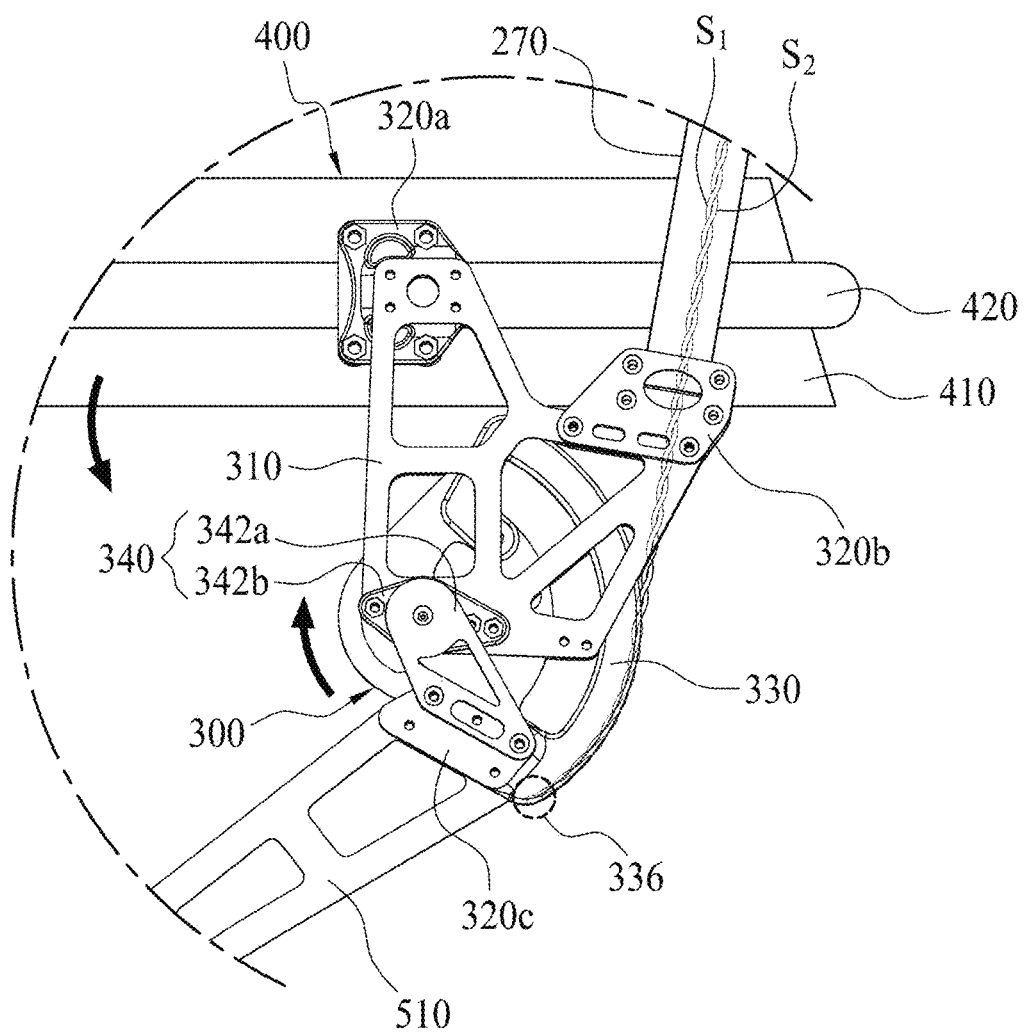
FIGS. 7 and 8 are views illustrating a driving process of the driving force conversion unit in the exoskeleton robot according to an embodiment of the present invention.
Figure 8:
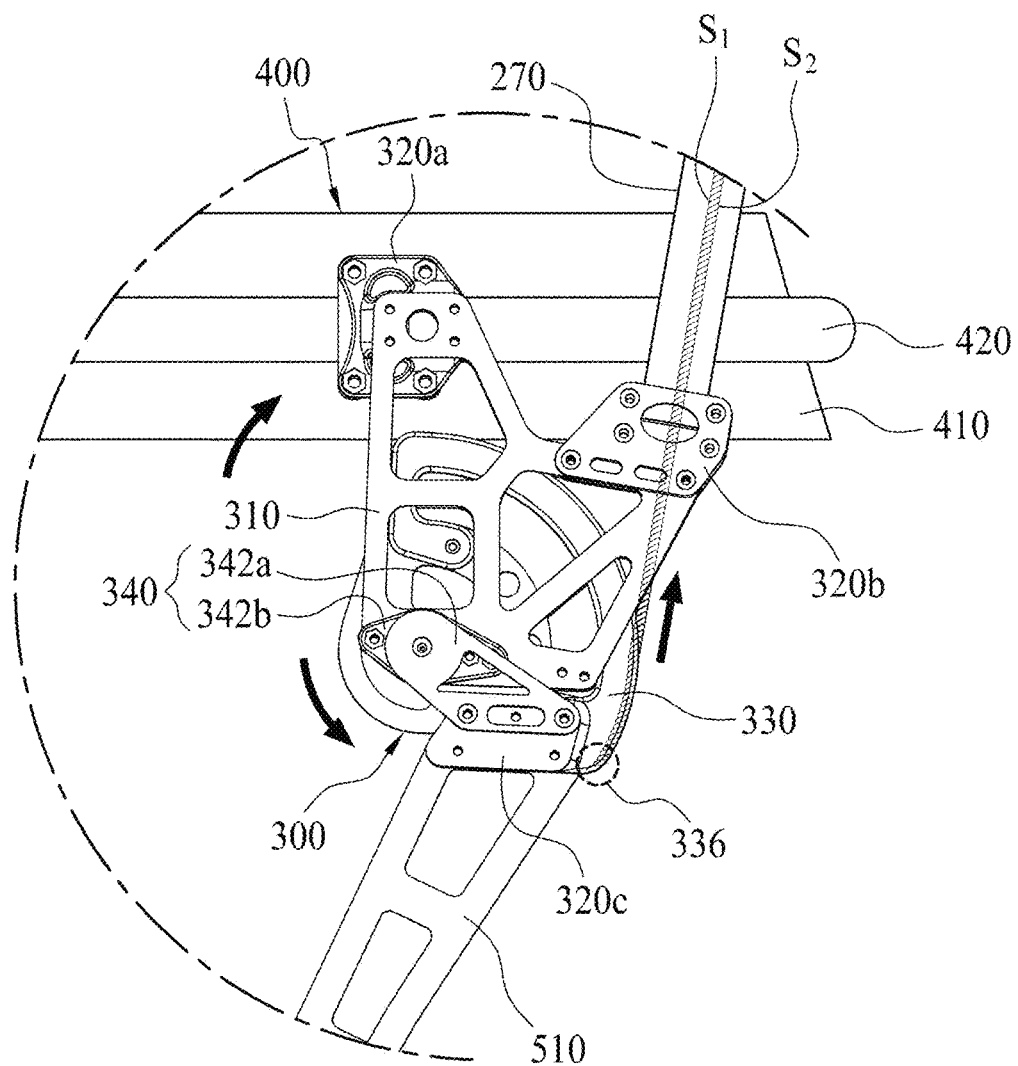

FIGS. 7 and 8 are views illustrating a driving process of the driving force conversion unit 300 in the exoskeleton robot according to an embodiment of the present invention.

As illustrated in FIG. 7, as the user bends his/her back, the rotation pulley 330 of the driving force conversion unit 300 is rotated relatively with respect to the fixed frame 310, and a distance between the string fixing region 336 to which the other side of the pair of strings S1 and S2 is fixed and the string coupling 222b to which one side of the pair of strings S1 and S2 is fixed increases.

Therefore, the driving motor 210 rotates the pair of strings S1 and S2 in a direction in which the pair of strings S1 and S2 are untwisted from each other, so as to correspond to the rotational displacement of the rotation pulley 330. In this case, the driving unit 200 may allow a load not to be applied to the user in a process in which the user bends his/her back or may allow an appropriate load to be applied to the user in the process in which the user bends his/her back by controlling a driving speed of the driving motor 210.

Next, as illustrated in FIG. 8, in a process in which the user lifts a heavy object in a state in which the user bends his/her back and then straightens his/her back, the driving motor 210 rotates the pair of strings S1 and S2 in a direction in which the pair of strings S1 and S2 are twisted with each other.

Therefore, an entire length of the pair of strings S1 and S2 decreases, such that the rotation pulley 330 of the driving force conversion unit 300 is rotated relatively with respect to the fixed frame 310 in an opposite direction, and the distance between the string fixing region 336 to which the other side of the pair of strings S1 and S2 is fixed and the string coupling 222b to which one side of the pair of strings S1 and S2 is fixed decreases.

Therefore, the driving unit 200 may assist a force so that a load is reduced in the process in which the user straightens his/her back.

As described above, the exoskeleton robot according to the present invention may assist an operation of the user through the string actuator-based driving unit 200 to generate a high output as compared with its own weight and provide a stable and efficient output, thereby making it possible to minimize a load applied to the user's waist and spine.

Meanwhile, results obtained by actually implementing the exoskeleton robot according to the present invention and testing the driving process will hereinafter be described.

Figure 9:
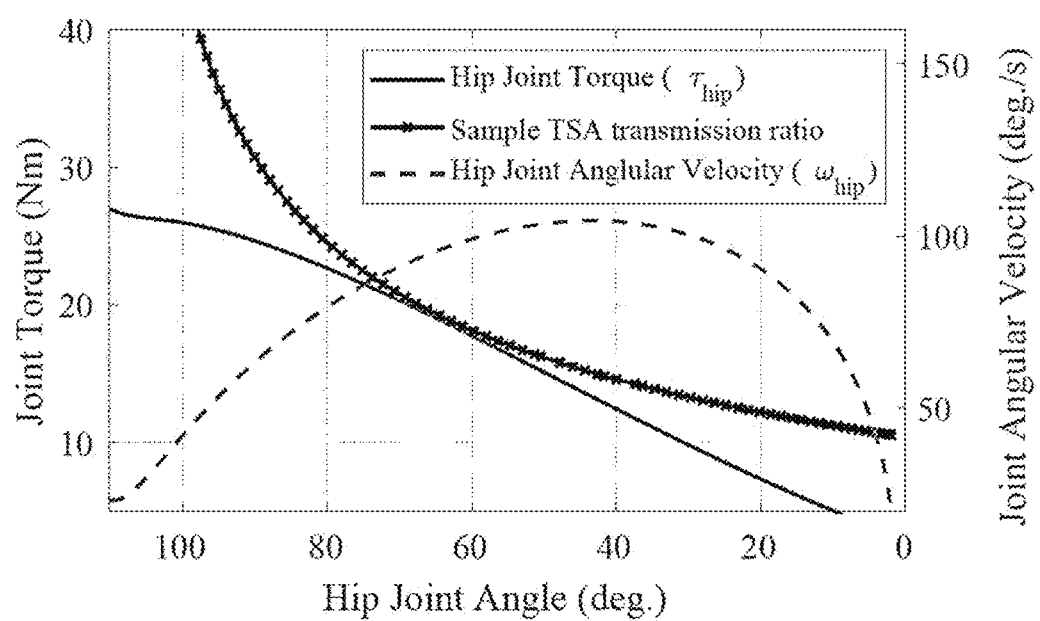
FIG. 9 is a graph illustrating a comparison result between a gear ratio of the string actuator and a torque required by the driving force conversion unit in a process in which a user lifts a heavy object.
Figure 10:
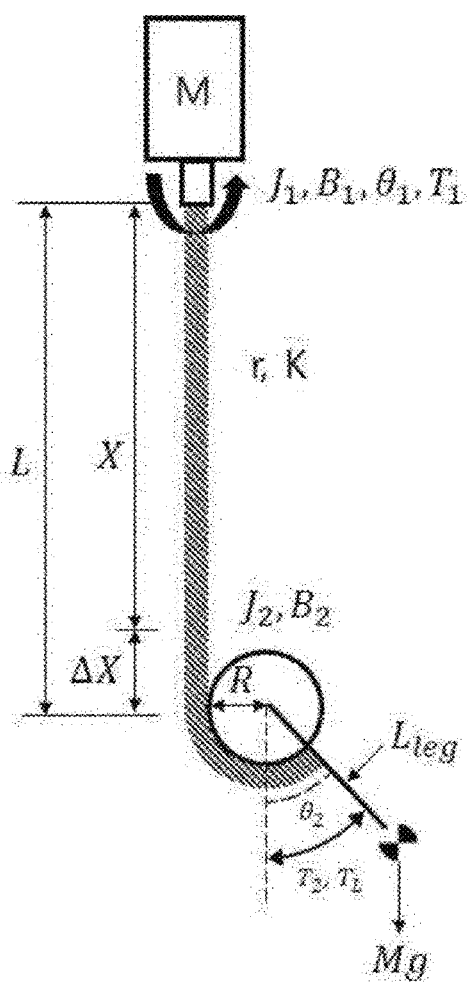
FIG. 10 is a conceptual diagram modeling the exoskeleton robot according to an embodiment of the present invention.

FIG. 9 is a graph illustrating a comparison result between a gear ratio of the string actuator and a torque required by the driving force conversion unit 300 in a process in which a user lifts a heavy object, and FIG. 10 is a conceptual diagram modeling the exoskeleton robot according to an embodiment of the present invention.

In the present test process, an entire length (L) of the string was set to 600 mm from the driving force conversion unit to the user's shoulder, and an average radius (r) of the string was set to 1 mm. In addition, a gearless direct current (DC) motor having a torque ($T_1$) of about 0.18 Nm was used as the driving motor.

$$R = \frac{\Delta X}{\theta_{2max}} = \frac{pL}{\theta_{2max}} \quad \text{[Equation 1]}$$

Here, R was calculated through a shrinkage amount ($\Delta X$) and a rotation angle ($\theta_2$) of the rotation pulley allowing a rotation range of the rotation pulley to be 0° to 120° as in the above Equation 1.

$$T_2 = RH(p)T_1 \quad \text{[Equation 2]}$$

Figure 11:
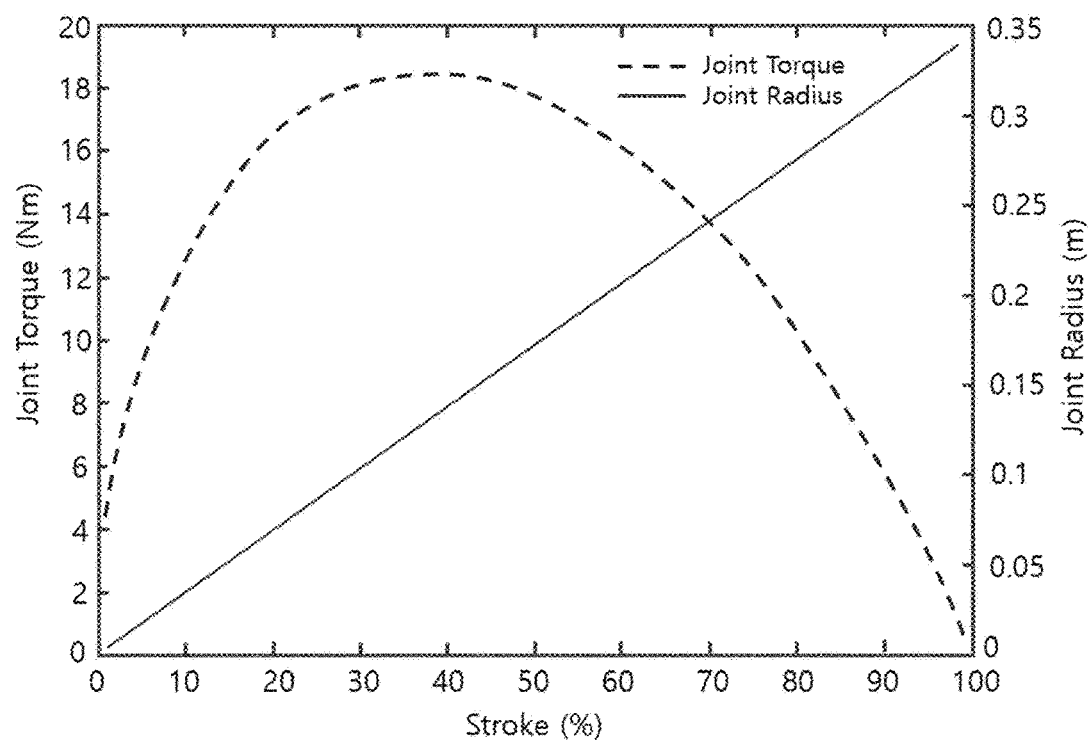
FIGS. 11 and 12 are graphs illustrating a radius and a torque of a rotation pulley according to a shrinkage rate.

In addition, FIG. 11 illustrates that a radius (R) and a torque ($T_2$) of the rotation pulley according to a shrinkage rate (p) are calculated according to the above Equation 2, and a maximum limiting condition for a design of the radius (R) of the rotation pulley may be set through the fact that a maximum joint torque ($T_2$max) may be achieved near p=38%.

Figure 12:
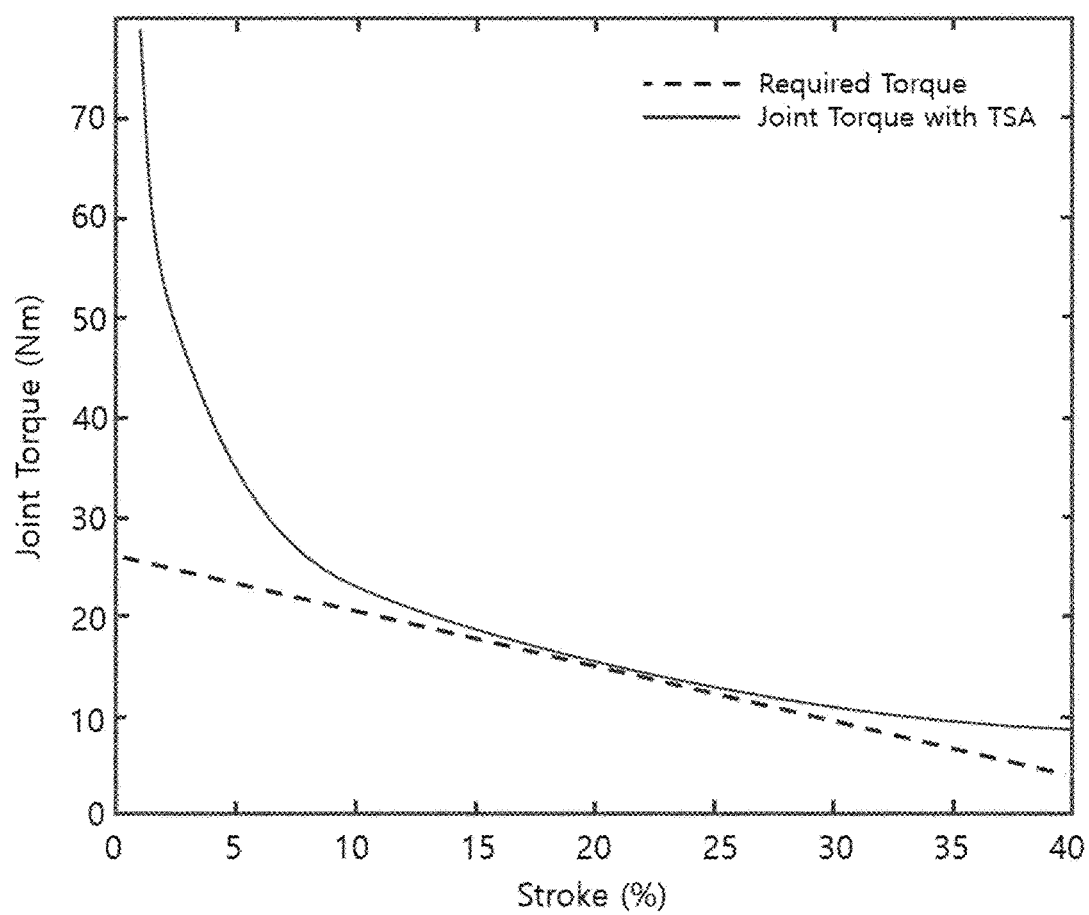

In order to satisfy a required torque calculated in a human body model of FIG. 9 with a driving motor of a minimum condition, the torque ($T_2$) of the rotation pulley should always be higher than a joint torque required for the driving force conversion unit as illustrated in a graph of FIG. 12.

Since R satisfying the required joint torque with minimum driving motor performance in this graph is about 63 mm, the radius of the rotation pulley satisfying the condition should be positioned between 63 and 127 mm, and the shrinkage rate of about 18% is selected so as to achieve a maximum joint rotation angle of about 120°.

Therefore, a model of the exoskeleton robot as illustrated in FIG. 10 was constructed in consideration of a moment of inertia ($J_1$), a coefficient of friction ($B_1$), and a load torque ($T_1$) of the driving motor, a moment of inertia ($J_2$) by the rotation pulley and the support unit, a coefficient of friction ($B_2$) of the rotation pulley, a joint torque by a weight of the support unit, and a load torque ($T_L$) by an external load.

In addition, each parameter value in the present model is illustrated in the following Table 1.

TABLE 1

| | | |
|---|---|---|
| $J_1$ | $5.38 \times 10^{-6}$ | $kgm^2$ |
| $J_2$ | $1.28 \times 10^{-5}$ | $kgm^2$ |
| $B_1$ | $1.98 \times 10^{-5}$ | Nm s |
| $B_2$ | $2.1 \times 10^{-3}$ | Nm s |
| L | 0.6 | m |
| r | $1.0 \times 10^{-3}$ | m |
| R | $62.5 \times 10^{-3}$ | m |

$$J_1\ddot{\theta}_1 + B_1\dot{\theta}_1 = \tau - T_1 \quad \text{[Equation 3]}$$

$$J_2\ddot{\theta}_2 + B_2\dot{\theta}_2 + MgL_{leg}\sin(\theta_2) = T_2 - T_L \quad \text{[Equation 4]}$$

$$T_1 = \frac{H}{R}T_2 \quad \text{[Equation 5]}$$

$$\Delta X = R\theta_2 = L - \sqrt{L^2 - (r\theta_1)^2} = L - X \quad \text{[Equation 6]}$$

$$\dot{\theta}_2 = \frac{H}{R}\dot{\theta}_1 \quad \text{[Equation 7]}$$

$$\ddot{\theta}_2 = \frac{1}{R}(\dot{H}\dot{\theta}_1 + H\ddot{\theta}_1) \quad \text{[Equation 8]}$$

$$\left[J_1 + J_2\left(\frac{H}{R}\right)^2\right]\ddot{\theta}_1 + \left[B_1 + B_2\left(\frac{H}{R}\right)^2\right]\dot{\theta}_1 + \quad \text{[Equation 9]}$$
$$J_2\left(\frac{HLr}{RX}\right)^2\dot{\theta}_1^2 + \ldots + \frac{H}{R}[MgL_{leg}\sin(\theta_2) + T_L] = \tau$$

$$J_1\ddot{\theta}_1 + B_1\dot{\theta}_1 + \frac{H}{R}[MgL_{leg}\sin(\theta_2) + T_L] = \tau \quad \text{[Equation 10]}$$

In addition, the above Equations are processes of organizing a dynamics model, and a dynamics model of Equation 9 may be organized by substituting Equation 4 into Equation 5 and substituting each of Equation 6, Equation 7, and Equation 8 into Equation 3.

Here, a gear ratio of the string actuator is a non-linear function, and considering the estimated moment of inertia ($J_2$) and bearing friction coefficient ($B_2$) after limiting the shrinkage rate to 30% or less, each term will show a smaller torque contribution than 0.17 Nm, which is a rated torque of the DC motor to be used in the test, and Equation 9 may thus be simplified to Equation 10 by excluding terms related to the moment of inertia ($J_2$) and the bearing friction coefficient ($B_2$).

$$\tau = Y \cdot P \quad \text{[Equation 11]}$$

Next, a given model is constructed by the dot product of a measured value (Y) and an estimated parameter (P) as in linear regressor Equation 11, and each parameter may then be estimated through a repeated experiment for a predetermined period.

$$J_1 \ddot{\theta}_1 + B_1 \dot{\theta}_1 + H\left[\frac{MgL_{leg}\sin(\theta_2)}{R}\right] + \frac{H}{R}T_L = \tau \qquad \text{[Equation 12]}$$

$$H(\theta_2) = \frac{r\sqrt{(2L - R\theta_2)R\theta_2}}{L - R\theta_2} = r\psi \qquad \text{[Equation 13]}$$

$$Y = [\ddot{\theta}_1, \dot{\theta}_1, \psi \sin(\theta_2), \psi\tau_L] \qquad \text{[Equation 14]}$$

$$P = \left[J_1, B_1, \frac{rMgL_{leg}}{R}, \frac{r}{R}\right]^T \qquad \text{[Equation 15]}$$

Equation 12 is decomposed into Equation 14 and Equation 15 by Equation 11, and in Equation 13, H may be represented as Equation 13 decomposed into an estimated parameter (r) and a measured value ($\psi$) by a shrinkage rate.

$$\frac{MgL_{leg}\sin(\theta_2)}{R} + F_L = F \qquad \text{[Equation 16]}$$

Meanwhile, a shrinkage force (F) of the string actuator may be measured through a load cell, and this value was integrated into the above Equation 16 because influences of a load due to an external load and weights of the support unit and the rotation pulley are measured together.

$$J_1 \ddot{\theta}_1 + B_1 \dot{\theta}_1 + HF = \tau \qquad \text{[Equation 17]}$$

$$Y = [\ddot{\theta}, \dot{\theta}, \psi F] \qquad \text{[Equation 18]}$$

$$P = [J_1, B_1, r]^T \qquad \text{[Equation 19]}$$

$$P = (Y^T Y)^{-1} Y^T \tau \qquad \text{[Equation 20]}$$

The simplified model Equation 17 was decomposed into Equations 18 and 19, and a pseudo inverse matrix was used in Equation 20 in order to estimate parameter P by multiplying a motor torque ($\tau$) accumulated through a repeated experiment by $Y^{-1}$.

Figure 13:
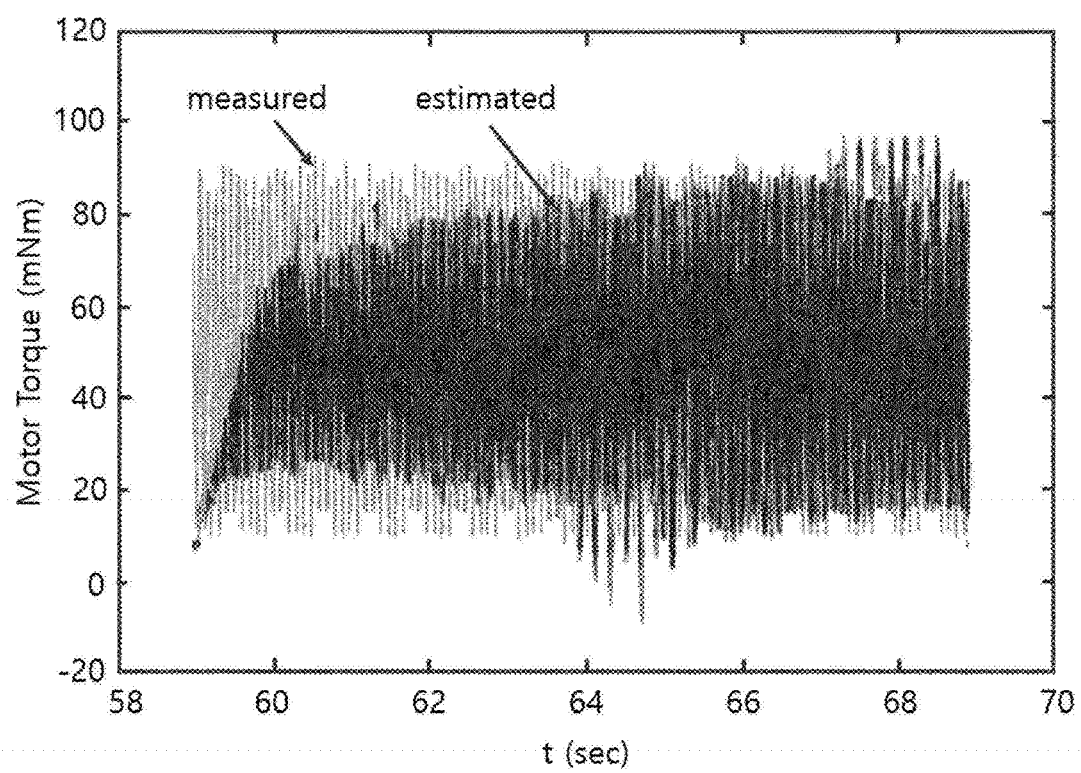
FIG. 13 is a graph illustrating a comparison result between an actual torque measured value and an estimated value of a driving motor.

FIG. 13 is a graph illustrating a comparison result between an actual torque measured value and an estimated value of a driving motor, and it can be seen that as measured values obtained by comparing estimated torque values obtained by substituting parameters estimated through data accumulated for each section into Equation 17 with measured motor torques are accumulated, the estimated value approaches the measured value.

Figure 14:
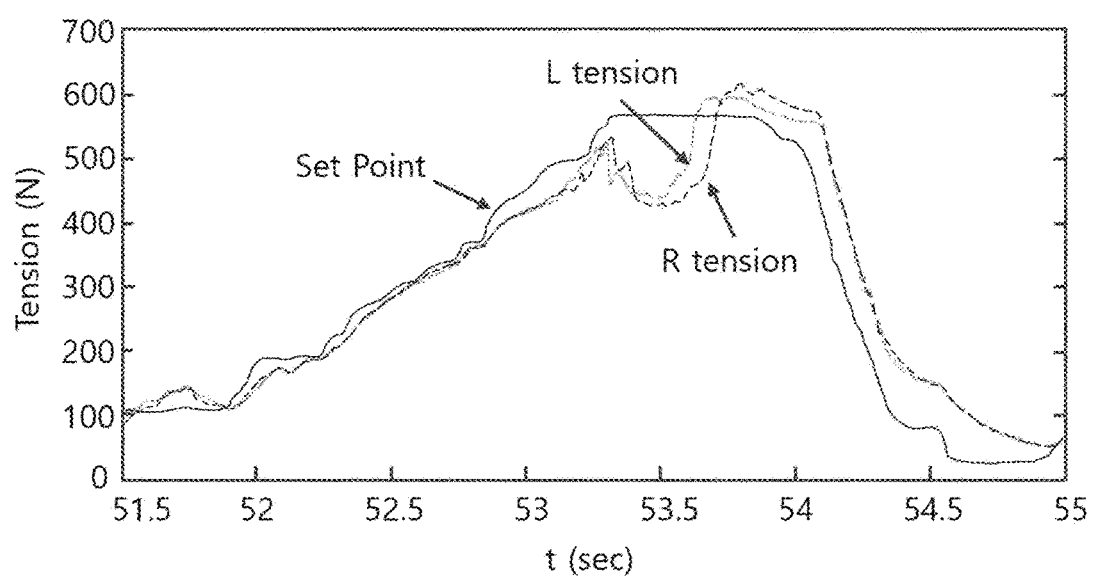
FIG. 14 is a graph illustrating a force control result of the string actuator.

In addition, FIG. 14 is a graph illustrating a unidirectional force control result of the string actuator, and illustrates force following performance of a controller with respect to a target value of the string actuator.

Figure 15:
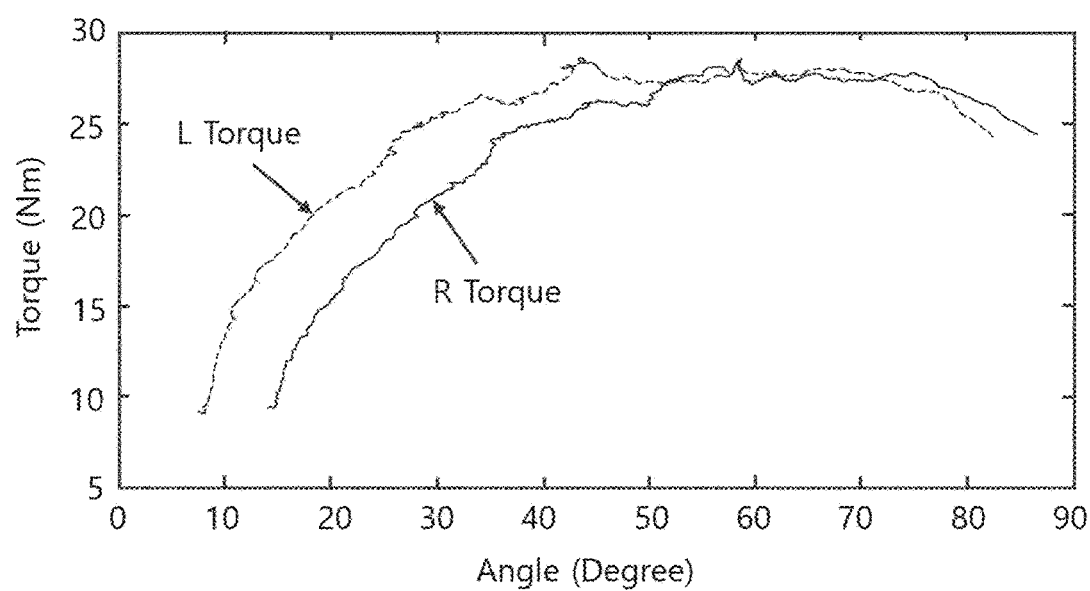
FIG. 15 is a graph illustrating a torque control result with respect to a rotation angle of the rotation pulley in the exoskeleton robot according to an embodiment of the present invention.

In addition, FIG. 15 is a graph illustrating a torque control result with respect to a rotation angle of the rotation pulley in the exoskeleton robot according to an embodiment of the present invention, and illustrates a torque measurement result at both ends of the left and the right according to the rotation angle of the rotation pulley and a result of following a target value changed according to a joint angle.

Figure 16:
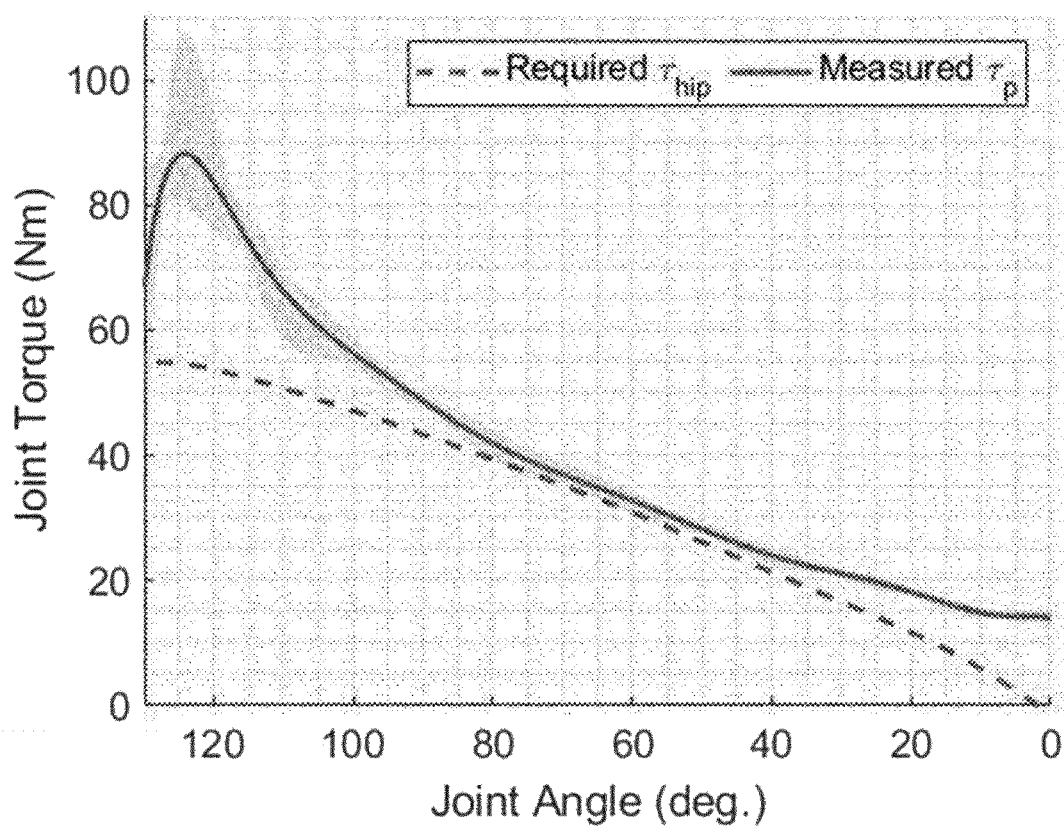
FIG. 16 is a graph illustrating a comparison result between an actual torque output and a required torque of the driving force conversion unit in the exoskeleton robot according to an embodiment of the present invention.

In addition, FIG. 16 is a graph illustrating a comparison result between an actual torque output and a required torque of the driving force conversion unit in the exoskeleton robot according to an embodiment of the present invention, and illustrates a torque output result of the driving force conversion unit for a rated motor torque input, and it is decided that a maximum torque is reached after the rotation pulley is rotated due to rigidity of the string, hardware play, and the like, in an initial joint angle section of 125 to 130°. It can be seen that the subsequently measured torque of the driving force conversion unit may satisfy required performance in almost all regions.

The preferred embodiment of the present invention has been described hereinabove, and it is obvious to those skilled in the art that the present invention may be implemented in other specific forms without departing from the spirit or scope of the present invention, in addition to the above-described embodiment. Therefore, the above-described embodiment is to be regarded as being illustrative rather than being restrictive, and accordingly, the present invention is not limited to the above description, but may be modified within the scope of the claims and their equivalents.

The invention claimed is:

1. A string actuator-based exoskeleton robot comprising:
    a driving force conversion unit including a fixed frame and a rotation pulley provided to be rotatable relatively with respect to the fixed frame and formed to be mountable on a side portion of the waist of a human body;
    a driving unit including a driving motor providing a driving force and a plurality of strings provided in double rows so as to have one side connected to the driving motor and the other side connected to the rotation pulley and assisting the rotation of the rotation pulley by twisting or untwisting the plurality of strings with or from each other by a rotational driving force of the driving motor to vary a length of the plurality of strings; and
    a support unit formed to extend from the rotation pulley to at least one of a front surface or a rear surface of the femoral region of the human body to support the femoral region of the human body,
    wherein a pair of driving force conversion units are provided on both side portions of the waist of the human body, and a pair of driving units and a pair of support units are provided to correspond to the pair of driving force conversion units.

2. The string actuator-based exoskeleton robot of claim 1, further comprising a control unit including a battery portion supplying power to the driving unit.

3. A string actuator-based exoskeleton robot comprising:
    a driving force conversion unit including a fixed frame and a rotation pulley provided to be rotatable relatively with respect to the fixed frame and formed to be mountable on a side portion of the waist of a human body;
    a driving unit including a driving motor providing a driving force and a plurality of strings provided in double rows so as to have one side connected to the driving motor and the other side connected to the rotation pulley and assisting the rotation of the rotation pulley by twisting or untwisting the plurality of strings with or from each other by a rotational driving force of the driving motor to vary a length of the plurality of strings; and
    a support unit formed to extend from the rotation pulley to at least one of a front surface or a rear surface of the femoral region of the human body to support the femoral region of the human body, wherein the driving force conversion unit further includes an encoder including:
a fixed detection portion provided in the fixed frame; and
a rotation detection portion provided in the rotation pulley so as to be rotatable relatively with respect to the fixed detection portion by sharing a rotary shaft of the rotation pulley with the fixed frame and detecting a rotational displacement of the rotation pulley in conjunction with the fixed detection portion.

4. A string actuator-based exoskeleton robot comprising:
a driving force conversion unit including a fixed frame and a rotation pulley provided to be rotatable relatively with respect to the fixed frame and formed to be mountable on a side portion of the waist of a human body;
a driving unit including a driving motor providing a driving force and a plurality of strings provided in double rows so as to have one side connected to the driving motor and the other side connected to the rotation pulley and assisting the rotation of the rotation pulley by twisting or untwisting the plurality of strings with or from each other by a rotational driving force of the driving motor to vary a length of the plurality of strings;
a support unit formed to extend from the rotation pulley to at least one of a front surface or a rear surface of the femoral region of the human body to support the femoral region of the human body; and
a mount unit which is provided to surround the waist of the human body and to which the fixed frame is fixed.

5. The string actuator-based exoskeleton robot of claim 4, wherein the mount unit includes:
a belt portion which is mounted to surround a circumference of the waist of the human body; and
a fastening portion which is provided on an outer side of the belt portion along at least a part of a circumference of the belt portion and to which the fixed frame is fastened.

6. The string actuator-based exoskeleton robot of claim 5, wherein the driving force conversion unit further includes a first connection portion connecting the fixed frame to the fastening portion.

7. A string actuator-based exoskeleton robot comprising:
a driving force conversion unit including a fixed frame and a rotation pulley provided to be rotatable relatively with respect to the fixed frame and formed to be mountable on a side portion of the waist of a human body;
a driving unit including a driving motor providing a driving force and a plurality of strings provided in double rows so as to have one side connected to the driving motor and the other side connected to the rotation pulley and assisting the rotation of the rotation pulley by twisting or untwisting the plurality of strings with or from each other by a rotational driving force of the driving motor to vary a length of the plurality of strings; and
a support unit formed to extend from the rotation pulley to at least one of a front surface or a rear surface of the femoral region of the human body to support the femoral region of the human body,
wherein the driving unit includes:
an extension guide providing a path through which the plurality of strings extend; and
a support frame having an inner portion in which an accommodating space is formed, an upper portion on which the driving motor is seated, and a lower portion to which the extension guide is connected.

8. The string actuator-based exoskeleton robot of claim 7, wherein
the driving force conversion unit further includes a second connection portion connecting the fixed frame to a lower end portion of the extension guide.

9. The string actuator-based exoskeleton robot of claim 7, wherein the driving unit further includes a coupler including a motor coupling which is connected to a rotary shaft of the driving motor to be rotated by the rotational driving force of the driving motor and a string coupling to which one side of the plurality of strings is connected and which is directly connected to the motor coupling to be rotated together with the motor coupling.

10. The string actuator-based exoskeleton robot of claim 7, wherein the driving unit further includes a load cell provided between the support frame and the extension guide and detecting an external force applied to the plurality of strings.

11. A string actuator-based exoskeleton robot comprising:
a driving force conversion unit including a fixed frame and a rotation pulley provided to be rotatable relatively with respect to the fixed frame and formed to be mountable on a side portion of the waist of a human body;
a driving unit including a driving motor providing a driving force and a plurality of strings provided in double rows so as to have one side connected to the driving motor and the other side connected to the rotation pulley and assisting the rotation of the rotation pulley by twisting or untwisting the plurality of strings with or from each other by a rotational driving force of the driving motor to vary a length of the plurality of strings; and
a support unit formed to extend from the rotation pulley to at least one of a front surface or a rear surface of the femoral region of the human body to support the femoral region of the human body,
wherein the support unit includes:
an extension portion having one side connected to the rotation pulley and the other side extending downward along an outer side portion of the femoral region of the human body; and
a support portion extending from a lower end portion of the extension portion to an inner side of the femoral region of the human body so as to support the front surface or the rear surface of the femoral region of the human body.

* * * * *